Aug. 23, 1960 B. D. LOUGHLIN 2,950,349

SYNCHRONIZING SYSTEM FOR BEAM-INDEXING COLOR-TELEVISION DISPLAY

Filed May 10, 1955 2 Sheets-Sheet 1

United States Patent Office 2,950,349

Patented Aug. 23, 1960

2,950,349

SYNCHRONIZING SYSTEM FOR BEAM-INDEXING COLOR-TELEVISION DISPLAY

Bernard D. Loughlin, Lynbrook, N.Y., assignor to Hazeltine Research, Inc., Chicago, Ill., a corporation of Illinois Filed May 10, 1955, Ser. No. 507,248

8 Claims. (Cl. 178—5.4)

This invention relates to synchronizing systems for color-television receivers and, more particularly, to such systems of the type which synchronizes the color element scanning of a color-image-reproducing apparatus and the color repetition of picture signals applied thereto. This type of system has particular utility in a color-television receiver employing a cathode-ray image reproducer in which a cathode-ray beam sequentially scans primary color elements to reproduce a composite image and in which there is developed an indexing signal representative of the scanning frequency and phase of given color elements by the cathode-ray beam. For convenience, such a cathode-ray image reproducer will be referred to hereinafter as a reproducer of the beam-indexing type.

Some prior cathode-ray image reproducers of the beam-indexing type have employed cathode-ray tubes having phosphor screens comprising red, green, and blue light-emissive phosphor stripes disposed in repetitive succession normal to line scan. The color-repetition frequency of the picture signals applied to the cathode-ray tube, that is, the frequency of the chrominance components, is synchronized with the color element scanning frequency. For example, the red color elements may be scanned at a 7 megacycle rate, more or less. The same is true of the blue and green elements. Accordingly, the red, green, and blue color-repetition frequency of the picture signals applied to the reproducer should be 7 megacycles in synchronism with the scanning of corresponding color elements.

Due to nonuniformity of color element scanning caused, for example, by nonuniform distribution of phosphor stripes on the cathode-ray tube screen or by nonlinearities of the line scan, the color element scanning frequency and phase vary across the image raster. Accordingly, in prior reproducers of the beam-indexing type, an indexing signal has been developed at suitable indexing electrodes to synchronize the frequency and phase of the picture signals applied to the cathode-ray tube and the color element scanning frequency.

Moreover, because of the low amplitude of the indexing signal, high-gain circuits are employed to translate the indexing signal of varying frequency from the display screen to the electron gun of the cathode-ray tube to control the frequency of picture signals or to the line-scan generator to control the frequency of color element scanning. These high-gain circuits inherently cause phase-shift variations in the translation of the indexing signal corresponding to its frequency variations. In other words, these high-gain indexing-signal translating circuits inherently have an over-all phase-frequency characteristic of positive phase slope. As is well known, a signal-translating circuit of positive phase slope causes a delay, known as "envelope" delay, in the translation of the modulation components of the translated signal. Such delay in the translation of modulation components representing the frequency variations of the indexing signal from, for example, the cathode-ray tube display screen to the electron gun results in color distortion of the reproduced image.

Also, changes of phase shift in the translation of the indexing signal corresponding to its frequency changes and due to a phase slope other than zero of the phase-frequency characteristic cause a color distortion of the reproduced image independent of envelope delay. This color distortion is due to the fact that as the instantaneous frequency of the indexing signal changes, the indexing signal is translated with a different phase shift from the display screen to the electron gun and hence causes a static color distortion even if the color element scanning frequency remains the same for a long enough period to allow the frequency of the indexing signal at the electron gun to be the same as the scanning frequency at the display screen.

It is an object of the present invention, therefore, to provide a new and improved synchronizing system for a color-television receiver which avoids one or more of the above-mentioned disadvantages and limitations of prior such systems.

It is another object of the invention to provide a new and improved synchronizing system for a color-television receiver employing a cathode-ray image reproducer of the beam-indexing type in which color distortion of the reproduced image is minimized.

It is another object of the invention to provide a new and improved synchronizing system for a color-television receiver employing a cathode-ray image reproducer of the beam-indexing type in which color distortion due to delay in the control of the frequency and phase of the picture signals at the color elements is minimized.

It is another object of the invention to provide a new and improved synchronizing system for a color-television receiver employing a cathode-ray image reproducer of the beam-indexing type in which color distortion due to changes of phase shift in the translation of the indexing signal is minimized.

In accordance with a particular form of the invention, in a color-television receiver including a cathode-ray image reproducer in which a cathode-ray beam having a predetermined line scan frequency sequentially scans primary color elements to reproduce a composite image and having color element scanning variations essentially repetitive at line scan frequency and including indexing means for developing an indexing signal representative of the scanning of given color elements by the cathode-ray beam, a system for synchronizing the scanning and the color repetition of picture signals applied to the reproducer comprises signal-translating means responsive to the indexing signal for controlling the color repetition of the picture signals as effective at the color elements but including circuit means inherently introducing into the indexing signal a phase shift which varies in accordance with the instantaneous frequency of the indexing signal and which delays the control of the color repetition of the picture signals accordingly. The syetem also includes circuit means responsive to the indexing signal for developing a control signal repetitive at line-scan frequency and representative of the frequency variations of the indexing signal and includes a low-pass filter network coupled to the circuit means for translating the control signal with a phase advance at least at fundamental line-scan frequency. Finally, the system includes circuit means responsive to the advance control signal for maintaining the total effective phase shift of the indexing signal in its effective translation from the indexing means to the color elements at approximately zero value to minimize the delay of the control, thereby minimizing color distortion of the reproduced image.

For a better understanding of the present invention, together with other and further objects thereof, reference is had to the following description taken in connection with the accompanying drawings, and its scope will be pointed out in the appended claims.

Referring to the drawings.

Figures 1, 2:
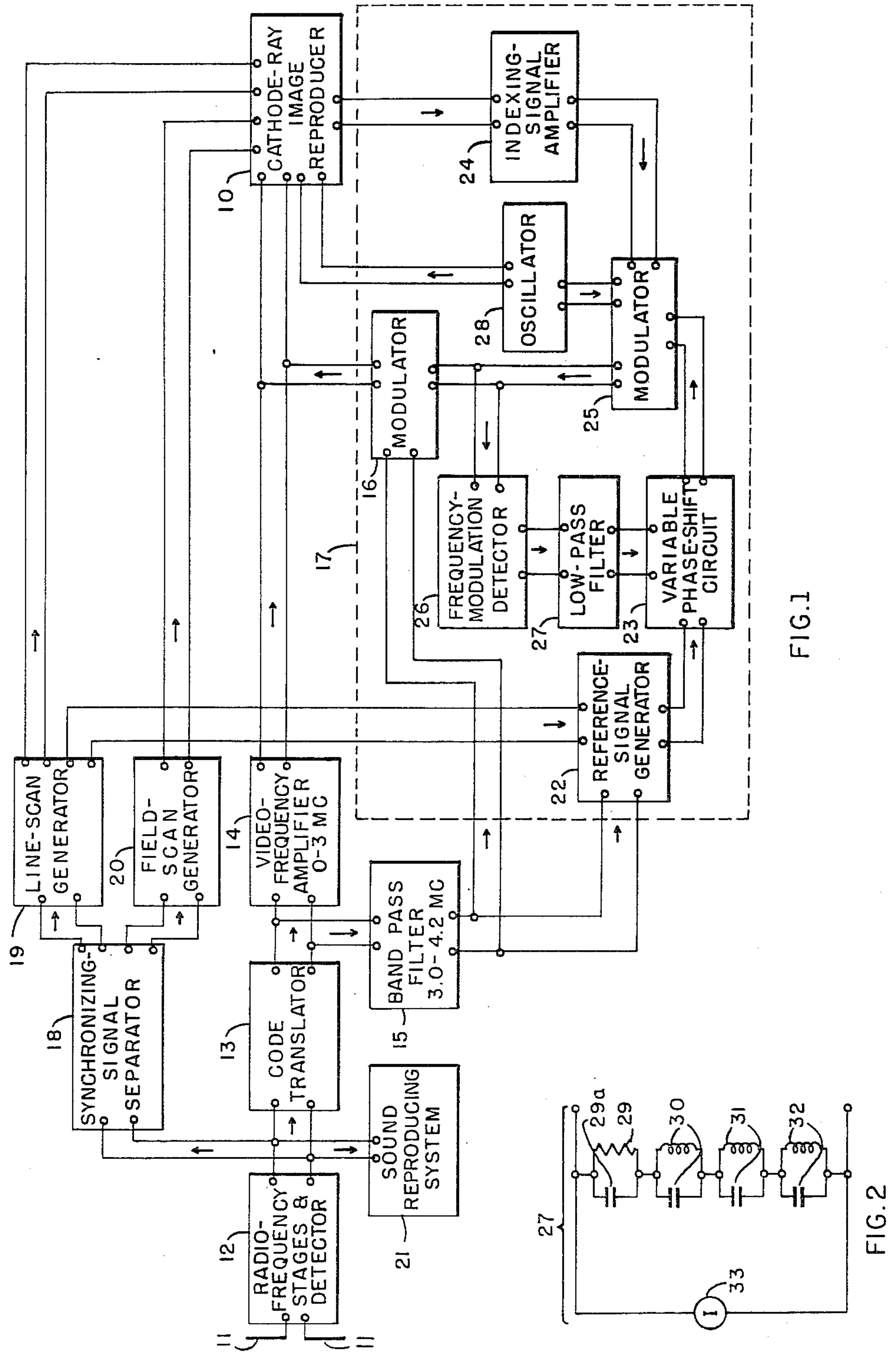
Fig. 1 is a schematic diagram of a color-television receiver including a synchronizing system constructed in accordance with the invention.
Fig. 2 is a detailed circuit diagram representing an equivalent circuit of a portion of the Fig. 1 receiver.
Figure 2A:
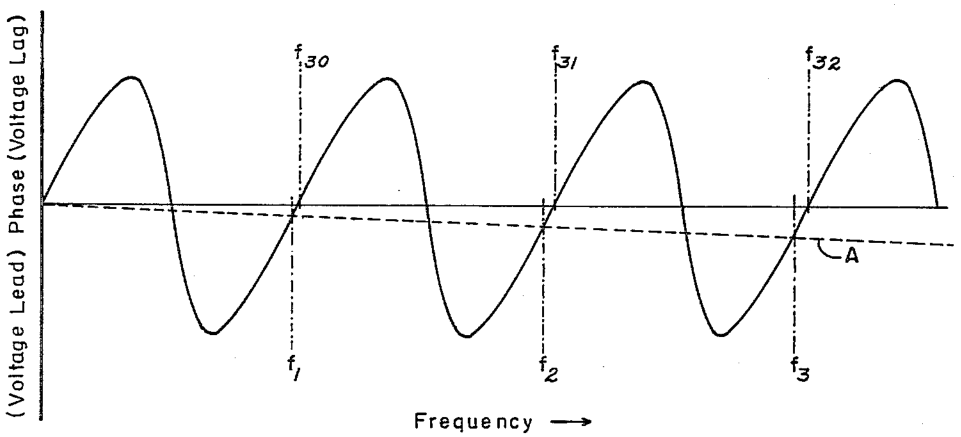
Figure 3:
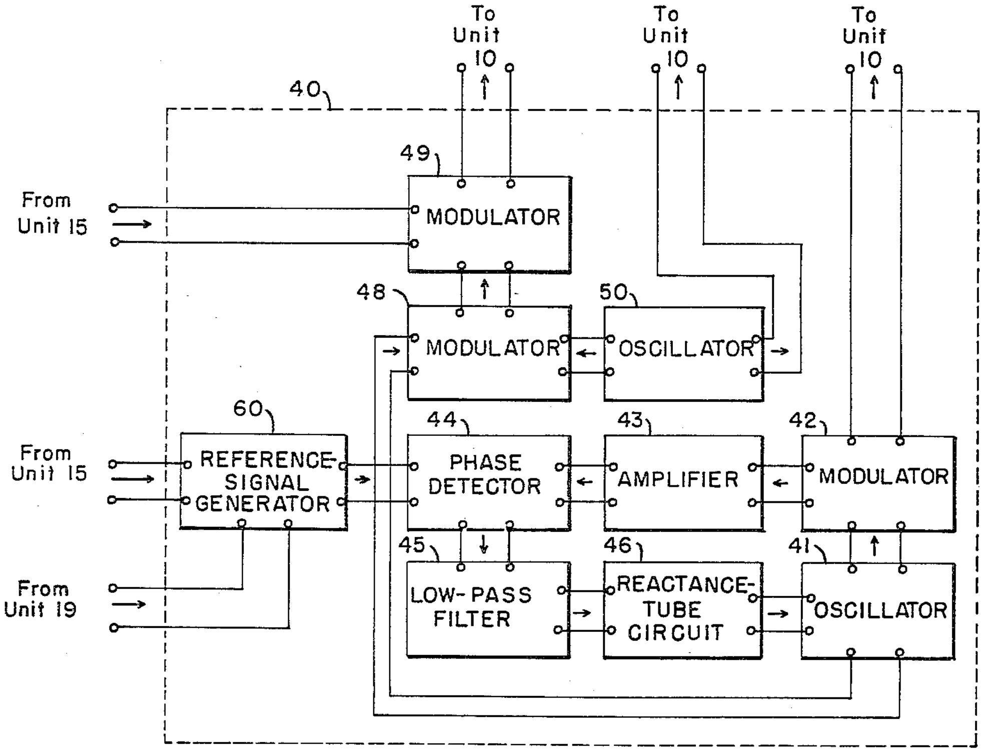

Fig. 2*a* is a graph representing the phase-frequency characteristic of the Fig. 2 circuit, and Fig. 3 is a schematic circuit diagram of an embodiment of the invention in modified form.

*General description and operation of Fig. 1 receiver*

Referring now more particularly to Fig. 1 of the drawings, there is represented a color-television receiver including a cathode-ray image reproducer 10 of conventional construction in which a cathode-ray beam sequentially scans primary color elements to reproduce a composite image and including indexing means for developing an indexing signal representative of the scanning of given color elements by the cathode-ray beam. In order to apply suitable picture signals to the cathode-ray image reproducer, the receiver includes an antenna system 11, 11 of conventional construction to which the following are connected in cascade: radio-frequency stages and detector 12 also of conventional construction for deriving video-frequency modulation components of the received television signal with chrominance-signal components at approximately 3.6 megacycles; a code translator 13 of conventional construction, preferably of the type described in an article by applicant entitled "Processing of the NTSC Color Signal for One-Gun Sequential Color Displays," Proceedings of the I.R.E., January 1954, and also known as a Y-to-M converter and subcarrier modifier, for converting the video-frequency modulation components to a so-called dot-sequential signal having chrominance components at approximately 3.6 megacycles and a luminance-correction component; and a video-frequency amplifier 14 having a pass band of, for example, 0–3 megacycles for translating the corrected luminance-signal component to the reproducer 10.

There is also provided a band-pass filter 15 having a pass band of, for example, 3.0–4.2 megacycles for translating the corrected chrominance components to a modulator 16 included in a synchronizing system 17 constructed in accordance with the invention and more fully described subsequently. In accordance with the invention, the modulator 16 converts the corrected chrominance components to, for example, components having a frequency of approximately 7 megacycles and properly synchronized with the color element scanning.

The receiver also includes a suitable synchronizing-signal separator 18 for separating the line-scan and field-scan synchronizing components from the output signal of the detector of unit 12. The separator 18 applies the line-scan and field-scan synchronizing components to line-scan and field-scan generators 19 and 20, respectively, which are connected to the reproducer 10 for controlling the scanning operations thereof to develop an image raster.

The receiver also includes a conventional sound-reproducing system 21 coupled to the unit 12 for reproducing sound in the usual manner.

*Description of Fig. 1 synchronizing system*

Referring now more particularly to the system 17 of Fig. 1 for synchronizing the color element scanning of the cathode-ray image reproducer 10 and the color repetition of picture signals applied thereto, the system preferably comprises circuit means for supplying a subcarrier reference signal synchronized with the color burst of a received composite video signal. This circuit means may, for example, be a reference-signal generator 22 coupled to the band-pass filter 15 and to the line-scan generator 19 for gating the color burst of the signal from unit 15 and having an output circuit coupled to a variable phase-shift circuit 23 for varying the phase of the reference signal in a manner more fully explained subsequently.

An oscillator 28 is coupled to input electrodes of the cathode-ray image reproducer 10 for modulating the intensity of the cathode-ray beam thereof at a frequency of, for example, 52 megacycles to provide a low-level indexing-signal carrier. In this connection, the cathode-ray tube of unit 10 may be of the single-beam type or of the dual-beam type, the latter developing a separate low-intensity beam modulated by the indexing-signal carrier.

The system 17 also includes signal-translating means responsive to the indexing signal developed in the cathode-ray image reproducer 10 for controlling the relation of the scanning of given color elements and the color repetition of the picture signals as effective at the color elements but inherently delaying the control of the aforesaid relation. For clarity of expression, the term "indexing signal" will be employed to refer to a signal which carries information representing the scanning of the color elements of the display screen, although this signal may undergo frequency conversions and also carry additional information in its translation around a complete circuit loop.

The signal-translating means includes circuit means inherently introducing into the indexing signal a phase shift which varies in accordance with the frequency of the indexing signal, for example, a relative phase lag which is proportional to frequency and which delays control of the frequency of the picture signals accordingly. More particularly, this circuit means comprises a high-gain indexing-signal amplifier 24 of conventional construction tuned to a side frequency of the indexing-signal carrier, for example, 45 megacycles, a modulator 25 responsive to the indexing signal, to the phase-shifted reference signal developed in the output circuit of unit 23, and to the output signal of the oscillator 28 for developing a variable frequency heterodyne signal, and a second modulator 16 responsive to received picture signals translated by the band-pass filter 15 and to the heterodyne signal developed by the modulator 25 for developing picture signals having a frequency synchronized with the color element scanning frequency of the cathode-ray image reproducer 10.

The system 17 also includes circuit means responsive to the indexing signal and coupled to the signal-translating means for advancing the control of the aforesaid relation to minimize the delay of that control, thereby minimizing color distortions of the reproduced image. More particularly, this circuit means is effective to introduce a phase shift which varies in accordance with the frequency of the indexing signal and which is of such magnitude and sense as to advance the control of the frequency of the picture signals to minimize the delay of that control by maintaining the total effective phase shift of the indexing signal in its effective translation from the indexing means to the color elements of unit 10 at approximately zero value. In this connection, as will be more fully explained subsequently, the frequency variations of the indexing signal are essentially repetitive at line-scan frequency and, in order to minimize the delay of the frequency control, the frequency control advancing circuit means maintains approximately zero phase shift for modulation components which are harmonics of line-scan frequency.

The frequency control advancing circuit means preferably comprises frequency-responsive circuit means, for example, a frequency-modulation detector 26 responsive to the indexing signal, as represented by the heterodyne-signal output of modulator 25, for developing a control signal repetitive at line-scan frequency and representative of the frequency variations of the indexing signal.

The frequency control advancing circuit means also includes a low-pass filter network 27 coupled to the detector 26 for translating the control signal with a phase shift at harmonics of the line-scan frequency, which phase shift is proportional to the harmonic frequency. The term "harmonic of line-scan frequency" is meant to include fundamental line-scan frequency. The filter 27 preferably comprises a multi-resonant circuit resonant slightly above harmonics of line-scan frequency for translating the control signal with a leading phase shift at least at fundamental line-scan frequency. The variable phase-shift circuit 23, also included in the frequency control advancing circuit means, may be of conventional construction comprising, for example, a reactance tube coupled across a resonant circuit tuned to the frequency of the reference signal. The circuit 23 is coupled to the output circuit of the low-pass filter 27 and to the modulator 25 of the signal-translating means for introducing a phase shift which varies in accordance with the frequency of the indexing signal and which is of such magnitude and sense as to maintain the total effective phase shift at approximately zero value, thereby maintaining an over-all effective phase-frequency characteristic of zero phase slope.

*Operation of Fig. 1 synchronizing system*

Considering now the operation of the Fig. 1 system 17, the cathode-ray beam of the cathode-ray image reproducer 10 during each line scan sequentially scans the color elements or stripes of the cathode-ray tube and develops at a suitable indexing electrode thereof an indexing signal representative of the scanning of stripes of a given color. Due to nonuniformity of color element scanning caused, for example, by nonuniform distribution of phosphor stripes on the cathode-ray tube screen or by nonlinearities of line scan, the color element scanning frequency and phase vary across the image raster. This scanning frequency may, for example, be approximately 7 megacycles and ordinarily varies across each line as the line is scanned with at most a slight variation at field-scan frequency. Accordingly, the frequency variation of the indexing signal is essentially repetitive at line-scan frequency.

Because of oscillator 28 which supplies a carrier signal for the indexing signal in a manner more fully described presently, the indexing signal developed at the output electrode of the reproducer 10 may have a varying frequency of, for example, approximately 45 megacycles corresponding to a side frequency of the carrier signal. This indexing signal is amplified by amplifier 24 and applied to modulator 25 wherein it beats with the output signal of oscillator 28 having a frequency of, for example, 52 megacycles and with the reference signal from unit 23 having a frequency of approximately 3.6 megacycles to develop a heterodyne signal having a frequency of, for example, 10.6 megacycles.

The heterodyne output signal of the modulator 25 is applied to the modulator 16 while the picture signals and, in particular, the corrected chrominance components translated by the band-pass filter 15 are applied to another input circuit of the modulator 16. The signals applied to the modulator 16 beat together in the modulator to develop output picture signals having a frequency of approximately 7 megacycles for application to the electron gun of the cathode-ray image reproducer 10.

Assuming for the moment the absence of circuits for advancing the control of the frequency of picture signals constructed in accordance with the invention, then, due to the inherent positive phase slope of the over-all phase-frequency characteristic of the indexing-signal amplifier 24 and modulators 25 and 16, the modulation components representing frequency variations of the indexing signal are delayed in translation from the indexing-signal output electrode of the cathode-ray image reproducer 10 to the electron gun thereof. Also, the modulation information representing frequency variations of the indexing signal is delayed in translation from the electron gun of the reproducer 10 to the display screen thereof within the cathode-ray tube. Accordingly, the control of the frequency of the picture signals as effective at the color elements of the display screen of the reproducer 10 is inherently delayed by the indexing-signal translating circuits.

The manner in which the system 17 advances the control of the frequency of the picture signals as effective at the color elements to minimize or eliminate the delay of the control will now be considered. The 10.6 megacycle heterodyne signal representing the indexing signal and developed in the output circuit of the modulator 25 is applied by the modulator 25 to the frequency-modulation detector 26. The detector 26 derives from the signal applied thereto a control signal repetitive at line-scan frequency because of the repetitive frequency variations of the indexing signal at line-scan frequency. Because of its repetitive nature and in accordance with Fourier analysis, the output signal of the detector 26 comprises a direct-current component, a fundamental component at line-scan frequency, and components at some harmonics of line-scan frequency.

The detector 26 applies the control signal to the low-pass filter 27 having an equivalent circuit represented diagrammatically in Fig. 2. The low-pass filter 27 includes, for example, a signal source represented by a constant-current generator 33. The constant-current generator is coupled across a multi-resonant circuit including a resistor 29 by-passed at line-scan frequency by a condenser **29*a* for deriving the direct-current component of the control signal, a first tuned circuit 30 for deriving the fundamental component, a second tuned circuit 31 for deriving the second harmonic component, and a third tuned circuit 32** for deriving the third harmonic component. Additional resonant circuits tuned to derive higher harmonic components of the control signal may be included in the low-pass filter if necessary for a particular application. Also, fewer resonant circuits may be utilized if desirable for a particular application. It should be understood that many low-pass filter circuits may be employed which have similar characteristics to the equivalent circuit of Fig. 2, for example, a ladder filter simulating a delay line and terminated in a high impedance at both terminals.

Referring now more particularly to Fig. 2*a* of the drawings, there is represented the phase-frequency characteristic of the Fig. 2 circuit. The resonant frequencies of the resonant circuits 30, 31, 32 are indicated as frequencies $f_{30}$, $f_{31}$, $f_{32}$ while the harmonic components of the control signal occur at frequencies $f_1$, $f_2$, $f_3$. As represented in Fig. 2*a*, the resonant circuits 30, 31, and 32 are so tuned that corresponding components of the control signal are developed across the circuits with a leading phase shift which is proportional to the harmonic frequency. In the embodiment represented, the circuits are individually tuned slightly above the harmonic frequencies. The value of the resistor 29 and the Q of the tuned circuits are so proportioned that the frequency components of the control signal are translated by the filter 27 with proper relative amplitudes to provide a desired reproduction of the input control signal.

Because the leading phase shift of each frequency component translated by the filter 27 is proportional to the frequency of that component, the filter 27 operates during the translation of the control signal as if it has a constant negative phase slope corresponding to the slope of broken line A of Fig. 2*a*. Accordingly, the control signal in the output circuit of the filter represents the control signal at the input circuit of the filter but leads the input signal with a time advance proportional to the apparent negative phase slope.

The advanced control signal is effective to control the phase of the reference signal translated by the variable phase-shift circuit 23. The variation of the phase shift of the reference signal is such that the total effective phase shift of the indexing signal developed at the output electrode of the reproducer 10 has approximately zero value in its translation from the output electrode through the signal-translating means 24, 25, 16 and through the cathode-ray tube to the display screen as a control of the frequency of the picture signals at the display screen. In this connection, it is assumed that the chrominance signal applied to the modulator 16 corresponds in phase to the color corresponding to the position of the indexing stripes on the display screen. Any variation from this condition means that the effective phase shift is computed with respect to a reference value other than zero. The fact that the indexing signal has a total effective phase shift of zero value in its translation around the circuit loop just described may be restated in terms that the overall effective phase-frequency characteristic has zero phase slope. Accordingly, because the over-all phase-frequency characteristic has zero phase slope, the indexing signal is not delayed in its translation around the circuit loop and the frequency of the picture signals as effective at the color stripes of the cathode-ray tube is exactly synchronous with the scanning of a given color stripe. In this manner, color distortion is minimized.

Further, since the indexing signal has a total effective phase shift of zero value in its translation around the circuit loop, no phase shift is introduced which could cause static color distortion of the reproduced image.

*Description of Fig. 3 system*

Referring now more particularly to Fig. 3 of the drawings, there is represented a synchronizing system 40 which may be utilized in the Fig. 1 receiver in lieu of the system 17 and interconnected with the units of the Fig. 1 receiver as indicated in Fig. 3. The Fig. 3 system minimizes color distortion of the reproduced image caused by delay in the translation of the modulation components of the indexing signal due to the phase slope of other than zero value of the phase-frequency characteristic of the indexing-signal translating means. Also, the Fig. 3 system minimizes static color distortion due to changes in phase shift with frequency changes in the translation of the indexing signal by providing substantially all of the amplification of the indexing signal at a substantially constant average frequency regardless of frequency variations of the indexing signal. The term "average frequency" is meant to indicate a frequency averaged over an interval substantially less than the period of line scan but more than the period of the indexing signal.

The system 40 includes an oscillator 41 of conventional construction for developing an output signal having a frequency, for example its average frequency, differing from that of the indexing signal by a substantially constant value. The output circuit of the oscillator 41 is coupled to first circuit means comprising a modulator 42 of conventional construction for deriving a signal having a frequency which tends to vary, that is, having, for example, a substantially constant average frequency but having phase variations.

The output circuit of the modulator 42 is coupled through a high-gain amplifier 43 of conventional construction to second circuit means comprising, for example, a phase detector 44 of conventional construction for deriving a repetitive control signal representative of angular velocity variations of the input signal to the phase detector with respect to a reference signal applied thereto by a reference-signal generator 60 similar to generator 22 of Fig. 1.

The output circuit of the phase detector 44 is coupled through a low-pass filter 45 which may be of similar construction to the low-pass filter 27 of the Fig. 1 embodiment for translating the control signal with a phase shift at least at fundamental line-scan frequency and preferably at other harmonics of line-scan frequency, which phase shift is proportional to the harmonic frequency for maintaining at approximately zero value the total effective phase shift for modulation components representing frequency variations of the indexing signal.

The system 40 also includes frequency control means comprising, for example, a reactance-tube circuit 46 of conventional construction responsive to the control signal for maintaining the average frequency of the oscillator 41 at a substantially constant difference from that of the indexing signal.

The system 40 also includes circuit means for translating the picture signals and responsive to the output signal of the oscillator 41 for controlling the frequency of the picture signals, thereby minimizing color distortion of the reproduced image. More particularly, this circuit means comprises, for example, modulators 48, 49 of conventional construction. The modulator 48 is responsive to the output signal of the oscillator 41 and to the output signal of an oscillator 50 which may be of similar construction to the oscillator 28 of the Fig. 1 embodiment while the modulator 49 is responsive to the output signal of the modulator 48 and to the picture signals supplied by the unit 15 for deriving picture signals having a color-repetition frequency synchronized with the color element scanning frequency of the cathode-ray image reproducer 10 of Fig. 1.

*Operation of Fig. 3 system*

Considering now the operation of the Fig. 3 system 40, while the color element scanning frequency of the cathode-ray image reproducer 10 of Fig. 1 varies in the neighborhood of, for example, 7 megacycles, the unit 10 applies an indexing signal to the modulator 42 having a corresponding frequency variation repetitive at line-scan frequency. The indexing signal applied to the modulator 42 may have a varying frequency of approximately 45 megacycles corresponding to a side frequency of the carrier signal supplied to the unit 10 by the oscillator 50.

The oscillator 41, which has its average frequency maintained at a substantially constant difference from that of the indexing signal applied to the modulator 42 in a manner presently to be described, supplies to the modulator 42 a heterodyne signal having a frequency of, for example, 41.4 megacycles. The modulator 42 then derives from the signals applied thereto an output signal having the substantially constant average frequency of, for example, 3.6 megacycles but having phase variations. This signal is translated through high-gain amplifier 43 for amplification and application to phase detector 44.

The reference-signal generator 60 supplies to the phase detector 44 a subcarrier reference signal synchronized with the color burst of the received video signal. The phase detector 44 derives from the indexing signal and the reference signal a control signal representative of the phase variations of the indexing signal with respect to the reference signal. This control signal is translated by the low-pass filter 45 in a manner similar to the translation of the control signal derived by detector 26 of the Fig. 1 embodiment. Accordingly, the filter 45 effectively advances the phase of the control-signal output of the phase detector 44 and applies the phase advanced control signal to the reactance-tube circuit 46 which maintains the average frequency of the oscillator 41 at a value substantially 3.6 megacycles below the average frequency of the indexing signal. Thus, as the average frequency of the indexing signal applied to the modulator 42 varies, the instantaneous frequency of the output signal of the modulator 42 varies, causing a phase variation with respect to the output signal of the reference-signal generator which is detected by the detector 44 and utilized after suitable phase advance by filter 45 as the control signal to vary the average frequency of the oscillator 41 accordingly.

The output signal of the oscillator 41 is applied to modulator 48 where it beats with the output signal of the oscillator 50 to derive a signal having a frequency of, for example, approximately 10.6 megacycles. This signal, in turn, beats with the chrominance components supplied to modulator 49 by the band-pass filter 15 of Fig. 1 to supply to the electron gun of the cathode-ray image reproducer 10 of Fig. 1 a signal having a frequency of, for example, approximately 7 megacycles.

Since substantially all of the amplification of the indexing-signal carrier occurs at a substantially constant frequency in the amplifier 43, the phase slope of the phase-frequency characteristic of the amplifier 43 does not cause an undesirable phase shift in the indexing signal for a static-frequency change of the indexing signal in its application to the modulator 42. The modulators 48 and 49 may be designed to have a phase-frequency characteristics of approximately zero phase slope because they need not provide amplification of the indexing signal. Accordingly, the system 40 does not cause an undesirable static phase shift in the indexing signal which would result in static color distortion due to a static-frequency change.

Because of the phase slope of the amplifier 43 which effects the translation of side-band components of the indexing signal, the amplifier 43 introduces into the indexing signal a phase shift which varies in accordance with the instantaneous frequency of the indexing signal and which delays the modulation components of the indexing signal in their effective translation to the color elements of the tube. For this reason, the low-pass filter 45 is utilized to advance the control of the frequency of the oscillator 41 which compensates the delay of the modulation components around the circuit loop. The advance in the control of the frequency of the oscillator 41 provides an over-all effective phase-frequency characteristic for the system 40 and the unit 10 of Fig. 1 having a phase slope of approximately zero value.

From the foregoing description, it will be apparent that a synchronizing system constructed in accordance with the invention has the important advantage that delay in the translation of the modulation components of an indexing signal representing the color element scanning is minimized or eliminated, thereby minimizing color distortion of the reproduced image. Also, static color distortion is minimized because of the translation of the indexing signal from the display screen to the electron gun of the cathode-ray tube with substantially the same effective phase shift regardless of any static-frequency change. Moreover, it will be apparent that while systems which provide synchronization by controlling the color-repetition frequency of picture signals have been specifically described, systems which provide synchronization by controlling the color element scanning frequency by, for example, controlling the instantaneous sweep slope of the output signal of the line-scan generator are also within the spirit and scope of the invention.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a color-television receiver including a cathode-ray image producer in which a cathode-ray beam having a predetermined line-scan frequency sequentially scans primary color elements to reproduce a composite image and having color element scanning variations essentially repetitive at line-scan frequency and including indexing means for developing an indexing signal representative of the scanning of given color elements by the cathode-ray beam, a system for synchronizing the scanning and the color repetition of picture signals applied to the reproducer comprising: signal-translating means responsive to said indexing signal for controlling the color repetition of said picture signals as effective at said color elements but including circuit means inherently introducing into said indexing signal a phase shift which varies in accordance with the instantaneous frequency of said indexing signal and which delays the control of said color repetition of said picture signals accordingly; circuit means responsive to said indexing signal for developing a control signal repetitive at line-scan frequency and representative of the frequency variations of said indexing signal; a low-pass filter network coupled to said circuit means for translating said control signal with a phase advance at least at fundamental line-scan frequency; and circuit means responsive to said advanced control signal for maintaining the total effective phase shift of said indexing signal in its effective translation from the indexing means to the color elements at approximately zero value to minimize the delay of said control, thereby minimizing color distortion of the reproduced image.

2. In a color-television receiver including a cathode-ray image reproducer in which a cathode-ray beam having a predetermined line-scan frequency sequentially scans primary color elements to reproduce a composite image and having color element scanning frequency variations essentially repetitive at line-scan frequency and including indexing means for developing an indexing signal representative of the scanning frequency of given color elements by the cathode-ray beam, a system for synchronizing the color-repetition frequency of picture signals applied to the reproducer with the scanning frequency comprising: signal-translating means responsive to said indexing signal for controlling the color-repetition frequency of said picture signals as effective at said color elements but including circuit means inherently introducing into said indexing signal a phase shift which varies in accordance with the frequency of said indexing signal and which delays the control of said color-repetition frequency of said picture signals accordingly; frequency-responsive circuit means responsive to said indexing signal for developing a control signal repetitive at line-scan frequency and representative of the frequency variations of said indexing signal; a low-pass filter network coupled to said frequency-responsive circuit means for translating said control signal with a leading phase shift at harmonics of line-scan frequency, which phase shift is proportional to the harmonic frequency; and variable phase-shift circuit means coupled to said low-pass filter network and to said signal-translating means for introducing a phase shift which varies in accordance with the frequency of said indexing signal and which is of such magnitude and sense as to maintain the total effective phase shift at approximately zero value in the effective translation of said indexing signal from the indexing means to the color elements to minimize the delay of said control, thereby improving synchronization of said color element scanning and color-repetition frequencies and minimizing color distortion of the reproduced image.

3. In a color-television receiver including a cathode-ray image reproducer in which a cathode-ray beam having a predetermined line-scan frequency sequentially scans primary color elements to reproduce a composite image and having color element scanning variations essentially repetitive at line-scan frequency and including indexing means for developing an indexing signal representative of the scanning of given color elements by the cathode-ray beam, a system for synchronizing the scanning and the color repetition of picture signals applied to the reproducer comprising: signal-translating means responsive to said indexing signal for controlling the color repetition of said picture signals as effective at said color elements but including circuit means inherently introducing into said indexing signal a phase shift which varies in accordance with the instantaneous frequency of said indexing signal and which delays the control of said color repetition of said picture signals accordingly; circuit means responsive to said indexing signal for developing a control signal repetitive at line-scan frequency and representative of the frequency variations of said indexing signal; resonant circuit means coupled to said circuit means and resonant slightly above one or more harmonics of line-scan frequency for translating said control signal with a phase advance at least at fundamental line-scan frequency; and circuit means coupled to said resonant circuit means and to said signal-translating means for maintaining the total effective phase shift of said indexing signal in its effective translation from the indexing means to the color elements at approximately zero value to minimize the delay of said control, thereby minimizing color distortion of the reproduced image.

4. In a color-television receiver including a cathode-ray image reproducer in which a cathode-ray beam having a predetermined line-scan frequency sequentially scans primary color elements to reproduce a composite image and having color element scanning frequency variations essentially repetitive at line-scan frequency and including indexing means for developing an indexing signal representative of the scanning frequency of given color elements by the cathode-ray beam, a system for synchronizing the color-repetition frequency of picture signals applied to the reproducer with the scanning frequency comprising: signal-translating means responsive to said indexing signal for controlling the color-repetition frequency of said picture signals as effective at said color elements but including circuit means inherently introducing into said indexing signal a phase shift which varies in accordance with the frequency of said indexing signal and which delays the control of said color-repetition frequency of said picture signals accordingly; frequency-responsive circuit means responsive to said indexing signal for developing a control signal repetitive at line-scan frequency and representative of the frequency variations of said indexing signal; a multiresonant circuit coupled to said frequency-responsive circuit means and resonant slightly above harmonics of line-scan frequency for translating said control signal with a leading phase shift at harmonics of line-scan frequency, which phase shift is proportional to the harmonic frequency; and variable phase-shift circuit means coupled to said multiresonant circuit and to said signal-translating means for introducing a phase shift which varies in accordance with the frequency of said indexing signal and which is of such magnitude and sense as to maintain the total effective phase shift at approximately zero value in the effective translation of said indexing signal from the indexing means to the color elements to minimize the delay of said control, thereby improving synchronization of said color element scanning and color-repetition frequencies and minimizing color distortion of the reproduced image.

5. In a color-television receiver, a system for synchronizing the color-repetition frequency of picture signals applied to a color-image reproducer with the color element scanning frequency thereof comprising: a cathode-ray color-image reproducer having primary color elements sequentially scanned by a cathode-ray beam having a predetermined line-scan frequency to reproduce a composite image and having color element scanning frequency variations essentially repetitive at line-scan frequency and including indexing means for developing an indexing signal representative of the scanning frequency of given color elements by the cathode-ray beam; circuit means for supplying a subcarrier reference signal synchronized with the color burst of a received composite video signal; a variable phase-shift circuit coupled to said supply circuit means for varying the phase of said reference signal; a modulator responsive to said indexing signal and to said phase-shifted reference signal for developing a variable-frequency heterodyne signal; a second modulator responsive to received picture signals and to said heterodyne signal for developing picture signals having a color-repetition frequency synchronized with said color element scanning frequency; a frequency-responsive detector for deriving a control signal repetitive at line-scan frequency and representative of frequency variations of said indexing signal; a low-pass filter network coupled to said frequency-responsive detector for translating said control signal with a leading phase shift at harmonics of line-scan frequency, which phase shift is proportional to the harmonic frequency; and said variable phase-shift circuit being responsive to said control signal for varying the phase of said phase-shifted reference signal in accordance with the frequency of said indexing signal to maintain the total effective phase shift of said indexing signal in its effective translation from said indexing means to said color elements at approximately zero value to minimize the delay of said control, thereby improving synchronization of said color element scanning and color-repetition frequencies and minimizing color distortion of the reproduced image.

6. In a color-television receiver including a cathode-ray image reproducer in which a cathode-ray beam sequentially scans primary color elements to reproduce a composite image and having essentially repetitive color element scanning variations and including indexing means for developing an indexing signal representative of the scanning of given color elements by the cathode-ray beam, a system for synchronizing the scanning and the color repetition of picture signals applied to the reproducer comprising: signal-translating means responsive to said indexing signal for controlling the relation of the scanning of given color elements and the color repetition of said picture signals as effective at said color elements but inherently tending to translate said indexing signal from the indexing means to the color elements with an effective phase shift of other than zero value; and circuit means responsive to repetitive variations of said indexing signal and coupled to said signal-translating means for advancing the phase of at least the fundamental component of variations of said indexing signal to maintain the total effective phase shift of said indexing signal in its effective translation from the indexing means to the color elements at approximately zero value, thereby improving synchronization of said color element scanning and color repetition and minimizing color distortion of the reproduced image.

7. In a color-television receiver, a system for synchronizing the color-repetition frequency of picture signals applied to a color-image reproducer with the color element scanning frequency thereof comprising: a cathode-ray color-image reproducer having primary color elements sequentially scanned by a cathode-ray beam having a predetermined line-scan frequency to reproduce a composite image and having color element scanning frequency variations essentially repetitive at line-scan frequency and including indexing means for developing an indexing signal representative of the scanning frequency of given color elements by the cathode-ray beam; an oscillator for developing an output signal having a frequency differing by a substantially constant value from that of said indexing signal; first circuit means responsive to said indexing signal and to said output signal of said oscillator for deriving a signal having a frequency which tends to vary; second circuit means for deriving a repetitive control signal representative of angular velocity variations of said derived signal; a low-pass filter network coupled to said second circuit means for translating said control signal with a leading phase shift at harmonics of line-scan frequency, which phase shift is proportional to the harmonic frequency for maintaining the total effective phase shift for modulation components representing frequency variations of said indexing signal at approximately zero value; frequency-control means responsive to said control signal for maintaining the frequency of said oscillator at a substantially constant difference from that of said indexing signal; and circuit means for translating said picture signals and responsive to said output signal of said oscillator for controlling the color-repetition frequency of said picture signals, thereby improving synchronization of said color element scanning and color-repetition frequencies and minimizing color distortion of the reproduced image.

8. In a color-television receiver, a system for synchronizing the color-repetition frequency of picture signals applied to a color-image reproducer with the color element scanning frequency thereof comprising: a cathode-ray color-image reproducer having primary color elements sequentially scanned by a cathode-ray beam having a predetermined line-scan frequency to reproduce a composite image and having color element scanning frequency variations essentially repetitive at line-scan frequency and including indexing means for developing an indexing signal representative of the scanning frequency of given color elements by the cathode-ray beam; an oscillator for developing an output signal having an average frequency differing by a substantially constant value from that of said indexing signal; a modulator responsive to said indexing signal and to said output signal of said oscillator for deriving a signal of substantially constant average frequency but having phase variations; circuit means for supplying a subcarrier reference signal synchronized with the color burst of a received composite video signal; a phase detector responsive to said subcarrier reference signal and to said phase-varying signal for deriving a repetitive control signal representative of said phase variations; a low-pass filter network coupled to said phase detector for translating said control signal with a leading phase shift at harmonics of line-scan frequency, which phase shift is proportional to the harmonic frequency for maintaining the total effective phase shift at approximately zero value for modulation components representing frequency variations of said indexing signal; frequency-control means responsive to said control signal for maintaining the average frequency of said oscillator at a substantially constant difference from that of said indexing signal; and circuit means for translating said picture signals and responsive to said output signal of said oscillator for controlling the color-repetition frequency of said picture signals, thereby improving synchronization of said color element scanning and color-repetition frequencies and minimizing color distortion of the reproduced image.

References Cited in the file of this patent

UNITED STATES PATENTS

| | | |
|---|---|---|
| 2,644,030 | Moore | June 30, 1953 |
| 2,671,129 | Moore | Mar. 2, 1954 |
| 2,674,651 | Creamer | Apr. 6, 1954 |
| 2,680,147 | Rhodes | June 1, 1954 |
| 2,713,605 | Bradley | July 19, 1955 |
| 2,715,155 | Bryan | Aug. 9, 1955 |
| 2,759,042 | Partin | Aug. 14, 1956 |
| 2,772,324 | Boothroyd | Nov. 27, 1956 |
| 2,782,252 | Fedde | Feb. 19, 1957 |
| 2,831,052 | Boothroyd | Apr. 15, 1958 |

OTHER REFERENCES

A Two-Color Direct-View Receiver for the RCA Color Television System, November 1949. (Copy in Division 16.)